United States Patent
Konno et al.

(10) Patent No.: US 7,387,180 B2
(45) Date of Patent: Jun. 17, 2008

(54) AIR GUIDE STRUCTURE IN MOTOR VEHICLE LEG SHIELD

(75) Inventors: Toshihiko Konno, Shizuoka (JP); Kaoru Kamimura, Shizuoka (JP); Naoto Gunaguchi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 449 days.

(21) Appl. No.: 10/515,565

(22) PCT Filed: May 13, 2004

(86) PCT No.: PCT/JP2004/006754

§ 371 (c)(1),
(2), (4) Date: May 17, 2005

(87) PCT Pub. No.: WO2004/103805

PCT Pub. Date: Dec. 2, 2004

(65) Prior Publication Data

US 2005/0224266 A1 Oct. 13, 2005

(30) Foreign Application Priority Data

May 20, 2003 (JP) .............................. 2003-142073

(51) Int. Cl.
*B60K 11/08* (2006.01)
*B62D 61/02* (2006.01)

(52) U.S. Cl. ...................... 180/68.3; 180/68.4; 180/219; 180/229

(58) Field of Classification Search ................. 180/68.1, 180/229, 219
See application file for complete search history.

(56) References Cited

U.S. PATENT DOCUMENTS

| | | | | | |
|---|---|---|---|---|---|
| 4,685,530 | A | * | 8/1987 | Hara | 180/219 |
| 4,818,012 | A | * | 4/1989 | Kohama et al. | 296/78.1 |
| 4,887,688 | A | * | 12/1989 | Horiike et al. | 180/229 |
| 4,964,484 | A | * | 10/1990 | Buell | 180/219 |
| 5,330,029 | A | * | 7/1994 | Yoshimura et al. | 180/219 |
| 6,651,769 | B2 | * | 11/2003 | Laivins et al. | 180/229 |

FOREIGN PATENT DOCUMENTS

| | | |
|---|---|---|
| JP | 59-97184 | 7/1984 |
| JP | 59-143721 | 8/1984 |
| JP | 03-048074 | 3/1991 |
| JP | 2002-173072 | 6/2002 |

* cited by examiner

*Primary Examiner*—Christopher Ellis
*Assistant Examiner*—Bridget Avery
(74) *Attorney, Agent, or Firm*—Keating and Bennett, LLP

(57) ABSTRACT

A vehicle includes a leg shield arranged to cover the front sides of the legs of a driver riding the vehicle and a heat exchanger arranged on the front surface side of the leg shield. The leg shield includes a wind guide space formed by a wall member of the leg shield, a first opening formed in a portion of the wall member of the leg shield located at least behind the heat exchanger for guiding air passing through the heat exchanger to the wind guide space and a second opening formed in another portion of the wall member of the leg shield separated from the first opening by a predetermined distance for discharging the air passing through the heat exchanger, guided to the first opening from the wind guide space.

28 Claims, 9 Drawing Sheets

AIR GUIDE STRUCTURE IN MOTOR VEHICLE LEG SHIELD

BACKGROUND OF THE INVENTION

1. Field of the Invention

The present invention relates to a vehicle, and more particularly, the present invention relates to a vehicle including a heat exchanger such as a radiator.

2. Description of the Related Art

A motorcycle (vehicle) including a radiator (heat exchanger) for cooling a water-cooled four-cycle engine is generally known. Such a motorcycle is disclosed in Japanese Patent Publication No. 3-48074, for example. In this motorcycle disclosed in Japanese Patent Publication No. 3-48074, a radiator and a pair of wind guide ducts for guiding cooling wind passing through the radiator are arranged in a region between the front surface of a leg shield covering the front sides of the legs of a driver and a cover covering the front surface of the leg shield. When the motorcycle is in motion, running wind (cooling wind) is introduced from an opening of the cover for cooling the radiator, while the cooling wind passing through the radiator is guided by the wind guide ducts to a portion behind a front wheel and then is discharged.

In the motorcycle disclosed in Japanese Patent Publication No. 3-48074, however, the pair of wind guide ducts must be provided independently of the leg shield, and hence the structure of a portion including a wind guide member for guiding the cooling wind passing through the radiator (heat exchanger) and the leg shield is disadvantageously complicated. Further, the motorcycle disclosed in Japanese Patent Publication No. 3-48074 guides the cooling wind passing through the radiator to the wind guide ducts only through an air stream of the cooling wind, and hence it is difficult to guide a sufficient quantity of air to the wind guide ducts from behind the radiator. Consequently, it is difficult to improve the cooling capability of the radiator (heat exchanger).

SUMMARY OF THE INVENTION

In order to overcome the problems described above, preferred embodiments of the present invention provide a vehicle having a much simpler structure for a wind guide that is arranged to guide air passing through a heat exchanger and a leg shield.

In addition, preferred embodiments of the present invention provide a vehicle that greatly improves the cooling capability of a heat exchanger.

A vehicle according to a first preferred embodiment of the present invention includes a leg shield arranged to cover front portions of legs of a driver riding the vehicle and including a wall member, and a heat exchanger arranged on a front surface side of the leg shield, wherein the leg shield includes a wind guide space defined by the wall member of the leg shield, a first opening formed in a portion of the wall member of the leg shield located at least behind the heat exchanger and the first opening being arranged to guide air passing through the heat exchanger to the wind guide space, a second opening formed in another portion of the wall member of the leg shield that is separated from the first opening by a distance and the second opening being arranged to discharge air that passes through the heat exchanger and is guided to the first opening from the wind guide space, a third opening connected to the wind guide space and opening toward a front portion of the vehicle, wherein the first opening is provided on an intermediate portion of a wind guide path for discharging air that is introduced from the third opening to pass through the wind guide space from the second opening, and the air introduced into the third opening is initially independent from the air passing through the heat exchanger and then the air introduced into the third opening and the air passing through the heat exchanger is mixed together in the wind guide space.

In the vehicle according to the first preferred embodiment of the present invention, the wind guide space is preferably defined by the wall member of the leg shield so that no part (wind guide member) forming the wind guide space is provided independently of the leg shield, whereby the structure of a portion including the wind guide member for guiding the air passing through the heat exchanger and the leg shield is greatly simplified. Further, the first opening for guiding the air passing through the heat exchanger to the wind guide space and the second opening for discharging the air, passing through the heat exchanger, guided to the wind guide space by the first opening from the wind guide space are arranged on the wall member of the leg shield such that the air passing through the heat exchanger can be easily discharged outward through the wind guide space.

According to the unique structure of the first preferred embodiment of the present invention, the vehicle in motion can exhaust air remaining behind the heat exchanger from the first opening through a stream of air flowing from the third opening toward the second opening, thereby increasing the flow rate of air introduced into the wind guide space from behind the heat exchanger. Thus, the flow rate of the air passing through the heat exchanger is increased such that the cooling capability of the heat exchanger is greatly improved. Consequently, it is possible to improve the cooling capability of the heat exchanger while simplifying the structure of the portion including the wind guide member for guiding the air passing through the heat exchanger and the leg shield. The air that is warmed by the heat exchanger and introduced into the wind guide space from behind the heat exchanger, is mixed with the air introduced from the third opening so as to be reduced in temperature, whereby the temperature of the air discharged from the second opening is greatly reduced. Thus, it is possible to prevent the warm air from hitting the driver, whereby the driver can enjoy a comfortable riding state.

In the vehicle of this preferred embodiment having the third opening, the third opening preferably has a function of introducing the air into the wind guide space when the vehicle is in motion and a function of discharging heat, introduced from the heat exchanger into the wind guide space, through the first opening when the vehicle comes to a halt. According to this unique structure, it is possible to suck air remaining behind the heat exchanger from the first opening and discharge the same from the second opening through the stream of air flowing from the third opening to the second opening when the vehicle is in motion. It is also possible to discharge the heat from the heat exchanger through the third opening when the vehicle comes to a halt. Thus, it is possible to excellently radiate the heat from the heat exchanger not only when the vehicle is in motion but also when the vehicle comes to a halt, whereby the cooling capability of the heat exchanger is even more improved.

In this case, the third opening is preferably located above the first opening and the heat exchanger in the vicinity of the upper end of the wind guide space. According to this structure, the heat can be easily discharged from the heat exchanger through the third opening since the heat is easily transmitted upward.

The aforementioned vehicle according to the first preferred embodiment of the present invention preferably further includes a first rib provided on the wall member of the leg shield and arranged to project from the edge of the first opening to cover at least the rear portion of the heat exchanger. According to this structure, the air passing through the heat exchanger and remaining behind the heat exchanger can be smoothly guided to the first opening through the first rib when the vehicle is in motion, whereby the flow rate of the air passing through the heat exchanger and introduced into the wind guide space can be further increased. Further, the first rib can smoothly guide the heat from the heat exchanger to the first opening when the vehicle comes to a halt, whereby heat radiation is excellently performed. Consequently, the cooling capability of the heat exchanger is even further improved.

In this case, the heat exchanger may include a pair of tank members spaced from each other by a predetermined distance along the lateral direction of the vehicle and a core member arranged between the pair of tank members, and the vehicle may further include a second rib provided on the wall member of the leg shield and arranged to project from the edge of the first opening to cover the front portions of the tank members of the heat exchanger. According to this unique structure, the second rib is arranged to guide the air directed toward the tank members provided on the front side of the heat exchanger to the core member of the heat exchanger when the vehicle is in motion, thereby increasing the flow rate of the air hitting the core member of the heat exchanger. It is possible to improve the cooling capability further with this structure.

In the aforementioned vehicle according to the first preferred embodiment of the present invention, the leg shield preferably includes a first cover member arranged at least behind the heat exchanger and a second cover member defining at least a portion of the wind guide space between the first and second cover members. According to this structure, the wind guide space (wind guide member) can be easily formed by the first cover member and the second cover member constituting the leg shield, whereby the structure of the portion including the wind guide member for guiding the air passing through the heat exchanger and the leg shield is greatly simplified.

In this case, the second cover member may include a rear cover member arranged on the side of the legs of the driver and a side cover member arranged on the outer side of the rear cover member.

In the aforementioned vehicle having the first cover member and the second cover member, the first opening is preferably formed in the first cover member. According to this structure, the first opening of the first cover member can easily guide the air passing through the heat exchanger to the wind guide space.

In the aforementioned vehicle having the first cover member and the second cover member, the leg shield preferably includes an upper surface member disposed on at least one of the first cover member and the second cover member and arranged to extend in the longitudinal direction, and a stowage space is preferably provided on the upper surface member. According to this structure, the stowage space can be easily provided on the leg shield.

In the aforementioned vehicle according to the first preferred embodiment of the present invention, the second opening is preferably arranged under the first opening. According to this structure, the vehicle in motion can easily discharge the air passing through the heat exchanger and guided to the wind guide space through the first opening from the lower second opening.

In the aforementioned vehicle including the third opening, the third opening is preferably provided in front of the heat exchanger. According to this structure, the third opening can be easily provided on the front portion of the wind guide space extending from the front portion toward the rear portion of the heat exchanger.

In the aforementioned vehicle including the third opening, the third opening may be formed to extend in the lateral direction of the vehicle. According to this structure, running wind can be introduced from the third opening in a wide region along the lateral direction of the vehicle when the vehicle is in motion, whereby it is possible to increase the flow rate of the air flowing from the third opening toward the second opening.

In the aforementioned vehicle according to the first preferred embodiment of the present invention, the heat exchanger is preferably arranged to extend in the lateral direction of the vehicle, the leg shield preferably includes a first cover member arranged to extend from the rear portion of the heat exchanger toward the front portion of the heat exchanger through the side portion to at least partially constitute the wind guide space, and the first opening is preferably formed in the first cover member while the heat exchanger extending in the lateral direction of the vehicle is preferably partially arranged in the wind guide space through the first opening. According to this structure, the length of the leg shield along the lateral direction of the vehicle can be reduced due to the heat exchanger being partially arranged in the wind guide space of the leg shield through the first opening. Thus, the leg shield can be prevented from increasing in size along the lateral direction of the vehicle, thereby preventing the width of the vehicle from expanding. Further, the heat exchanger is partially arranged in the wind guide space through the first opening such that the air passing through the heat exchanger can be more easily guided into the wind guide space from the first opening. Thus, the flow rate of the air passing through the heat exchanger is increased such that the cooling capability of the heat exchanger is greatly improved.

In this case, the heat exchanger may include a pair of tank members spaced from each other by a certain distance along the lateral direction of the vehicle and a core member arranged between the pair of tank members, and at least one of the pair of tank members may be arranged in the wind guide space through the first opening. According to this structure, the leg shield can be easily prevented from increasing in size in the lateral direction of the vehicle, while the cooling capability of the heat exchanger is greatly improved.

A vehicle according to a second preferred embodiment of the present invention includes a leg shield arranged to cover front portions of legs of a driver riding the vehicle and including a wall member, and a heat exchanger arranged on a front surface side of the leg shield, wherein the leg shield includes a wind guide space defined by the wall member of the leg shield, a first opening formed in a portion of the wall member of the leg shield located at least behind the heat exchanger and the first opening being arranged to guide air passing through the heat exchanger to the wind guide space, a second opening formed in another portion of the wall member of the leg shield that is separated from the first opening by a distance and the second opening being arranged to discharge air that passes through the heat exchanger and is guided to the first opening from the wind guide space, a third opening connected to the wind guide space and opening toward a front portion of the vehicle, wherein the first opening is provided on an intermediate portion of a wind guide path for discharging air that is introduced from the third opening to pass through the wind guide space from the second opening, and air in the heat exchanger is exhausted via the first opening by way of steams of air flowing from the third opening toward the second opening.

With this unique structure, the second preferred embodiment of the present invention achieves the advantages as described with reference to the first preferred embodiment described above. Furthermore, the various additional features of the first preferred embodiment described above are also possible to be used in the second preferred embodiment of the present invention, and thus repetitive description thereof will be avoided.

Other preferred embodiments of the present invention are also possible. For example, another preferred embodiment of the present invention provides a vehicle including a heat exchanger and a wind guide. The wind guide includes an inlet for introducing air when the vehicle is in motion, an outlet spaced a predetermined distance from the inlet for discharging the introduced air, a wind guide member constituting a wind guide path connecting the inlet and the outlet with each other and an opening provided on a portion of the wind guide member located at least behind the heat exchanger for guiding the air passing through the heat exchanger to the wind guide path.

In the vehicle according to this other preferred embodiment of the present invention, the wind guide member constituting the wind guide path connecting the inlet and the outlet with each other is provided with the opening for guiding the air passing through the heat exchanger to the wind guide path so that a wind guide member for guiding the air passing through the heat exchanger can be formed by only the wind guide member, whereby the structure of the wind guide member is greatly simplified. Further, the vehicle in motion can exhaust air remaining behind the heat exchanger from the opening to the wind guide path through a stream of air flowing from the inlet toward the outlet, thereby increasing the flow rate of air introduced into the wind guide path from behind the heat exchanger. Thus, the flow rate of the air passing through the heat exchanger is increased such that the cooling capability of the heat exchanger is greatly improved. Further, the air that is warmed by the heat exchanger and introduced into the wind guide space from behind the heat exchanger, is mixed with the air introduced from the inlet such that the warmed air is significantly reduced in temperature, whereby the temperature of the air discharged from the outlet is greatly reduced. Thus, it is possible to prevent the warm air from hitting a driver, whereby the driver can enjoy a comfortable riding state.

In the aforementioned vehicle according to this other preferred embodiment of the present invention, the wind guide preferably includes a leg shield covering the front sides of the legs of a driver riding the vehicle. According to this structure, no part (wind guide member) forming the wind guide path is provided independently of the leg shield, whereby the structure of a portion including the wind guide member for guiding the air passing through the heat exchanger and the leg shield is easily and greatly simplified.

In the aforementioned vehicle according to this other preferred embodiment of the present invention, the inlet is preferably arranged to discharge heat introduced from the heat exchanger through the opening when the vehicle comes to a halt, in addition to being arranged to introduce air into the wind guide path when the vehicle is in motion. According to this structure, it is possible to suck air remaining behind the heat exchanger from the opening and discharge the same from the outlet through a stream of air flowing from the inlet to the outlet when the vehicle is in motion while the heat can be discharged from the heat exchanger through the outlet when the vehicle comes to a halt. Thus, the heat can be excellently radiated from the heat exchanger not only when the vehicle is in motion but also when the vehicle comes to a halt, whereby the cooling capability of the heat exchanger is even more improved.

In this case, the inlet is preferably provided above the opening and the heat exchanger in the vicinity of the upper end of the wind guide path. According to this structure, the heat can be easily discharged from the heat exchanger through the outlet when the vehicle comes to a halt since the heat is easily transmitted upward.

In the aforementioned vehicle according to this other preferred embodiment of the present invention, the inlet may be formed in front of the heat exchanger, the outlet may be formed at the back of the heat exchanger, the wind guide path may be arranged to extend from the front portion toward the rear portion of the heat exchanger, and the opening may be formed in the vicinity of the heat exchanger. Alternatively, the inlet may be formed above the heat exchanger, the outlet may be formed below the heat exchanger, the wind guide path may be arranged to extend from the front portion toward the rear portion of the heat exchanger, and the opening may be provided in the vicinity of the heat exchanger.

A vehicle according to yet another preferred embodiment of the present invention includes a leg shield covering the front sides of the legs of a driver riding the vehicle and a heat exchanger arranged on the front surface side of the leg shield and so to extend in the lateral direction of the vehicle. The leg shield includes a first cover member that is arranged to extend from the rear portion of the heat exchanger toward the front portion of the heat exchanger through the side portion, having a first opening and a second cover member defining a wind guide space between the first and second cover members, and the heat exchanger extending in a lateral direction of the vehicle is partially arranged in the wind guide space through the first opening.

In the vehicle according to this additional preferred embodiment of the present invention, as hereinabove described, the wind guide space is formed by the first cover member and the second cover member constituting the leg shield so that no part (wind guide member) forming the wind guide space is provided independently of the leg shield, whereby the structure of a portion including the wind guide member for guiding air passing through the heat exchanger and the leg shield is greatly simplified. Further, the heat exchanger extending in the lateral direction of the vehicle is partially arranged in the wind guide space through the first opening so that the length of the leg shield along the lateral direction of the vehicle can be reduced due to the heat exchanger being partially arranged in the wind guide space of the leg shield through the first opening. Thus, it is possible to prevent the leg shield from increasing in size in the lateral direction of the vehicle, thereby preventing the width of the vehicle from expanding. Further, the heat exchanger is partially arranged in the wind guide space through the first opening such that the air passing through the heat exchanger can be more easily guided from the first opening into the wind guide space, whereby the flow rate of air introduced into the wind guide space from behind the heat exchanger is greatly increased. Consequently, the flow rate of the air passing through the heat exchanger is increased such that the cooling capability of the heat exchanger is greatly improved.

In this case, the heat exchanger may include a pair of tank members spaced from each other by a predetermined distance along the lateral direction of the vehicle and a core member arranged between the pair of tank members, and at least one of the pair of tank members may be arranged in the wind guide space through the first opening. According to this structure, the leg shield can be easily prevented from increasing in size in the lateral direction of the vehicle, while the cooling capability of the heat exchanger can be greatly improved.

A vehicle according to yet a further preferred embodiment of the present invention includes a leg shield covering the front sides of the legs of a driver riding the vehicle and a heat exchanger arranged on the front surface side of the leg shield. The leg shield includes a first wall member extending in the longitudinal direction and a second wall member extending downward from the rear portion of the first wall member, and the heat exchanger is at least partially arranged under the first wall member in front of the second wall member.

In the vehicle according to this preferred embodiment of the present invention, the heat exchanger is at least partially arranged under the first wall member of the leg shield and in front of the second wall member so that a space for arranging the heat exchanger can be ensured without affecting or limiting the function of the leg shield covering the front sides of the legs of the driver riding the vehicle.

In this case, the leg shield may further include a third wall member extending upward from an end of the first wall member, and at least the first wall member and the third wall member may define a stowage space. As a result of this unique structure, the stowage space can be easily provided on the leg shield.

Other features, elements, characteristics and advantages of the present invention will become more apparent from the following detailed description of preferred embodiments with reference to the attached drawings.

DETAILED DESCRIPTION OF PREFERRED EMBODIMENTS

Figure 1:
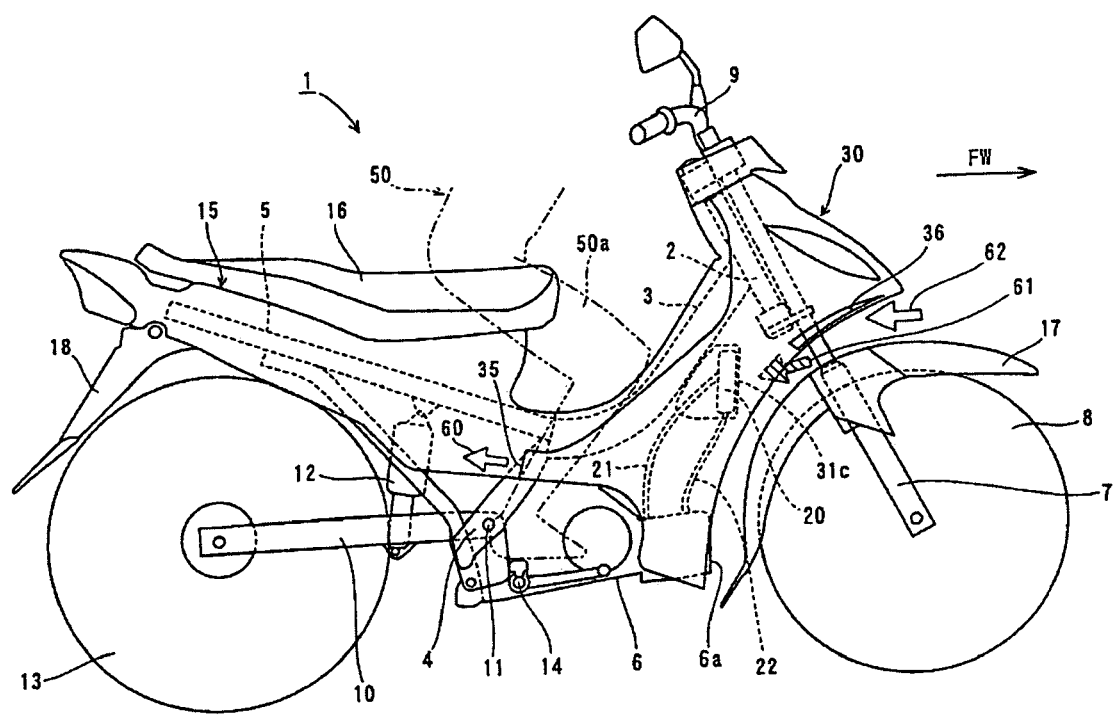
FIG. 1 is a side elevational view of a motorcycle according to a first preferred embodiment of the present invention.

Preferred embodiments of the present invention will now be described with reference to the drawings. Referring to the drawings, arrow FW denotes the forward traveling direction of a motorcycle 1.

First Preferred Embodiment

In the motorcycle 1 according to the first preferred embodiment, the front end of a mainframe 3 is connected to a head pipe 2, as shown in FIG. 1. The mainframe 3 is arranged to extend in a rearward direction as shown in FIG. 1. Rear arm brackets 4 and a seat rail 5 are connected to the rear end of the mainframe 3. The head pipe 2, the mainframe 3, the rear arm brackets 4 and the seat rail 5 constitute a body frame. An engine, preferably a water-cooled four-cycle engine 6, for example, is preferably mounted on the rear end of the mainframe 3 and the rear arm brackets 4. As can be understood, the water-cooled four-cycle engine 6 is just an example and other engines may be used. The engine 6 is arranged in a substantially horizontal manner and has a cylinder 6a disposed at a front portion thereof.

A front wheel 8 is rotatably mounted on the head pipe 2 through a front fork 7. A handle 9 is mounted on the head pipe 2. The handle 9 is used to steer by moving the front wheel 8 via the front fork 7. The front portions of rear arms 10 are mounted on the rear arm brackets 4 so as to be pivotable about a pivot shaft 11. The rear arms 10 are supported on the seat rail 5 through a rear shock absorber 12. A rear wheel 13 is rotatably mounted on the rear portions of the rear arms 10. Footrests 14 for receiving feet are mounted on the rear arm brackets 4. The footrests 14 are preferably located on side portions of the engine 6.

A rear cowl 15 is provided to cover the seat rail 5. A seat 16 is mounted on the upper portion of the rear cowl 15. A driver 50 sitting on the seat 16 drives the motorcycle while placing his/her feet on the footrests 14. A front fender 17 covering the front wheel 8 is mounted on the front fork 7. The front fender 17 is moved in association with the front wheel 8. A rear fender 18 covering the rear wheel 13 is mounted on the rear cowl 15.

Figure 4:
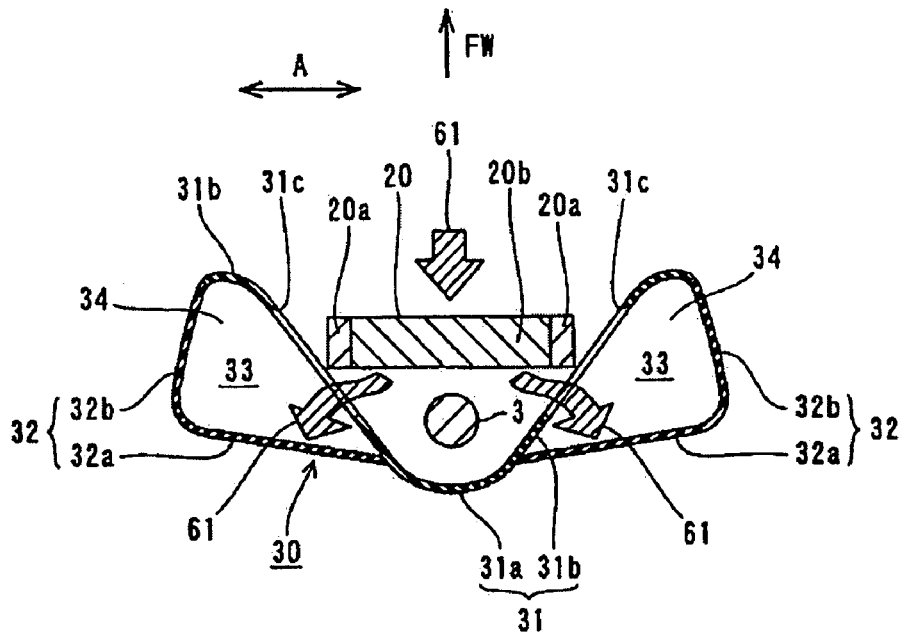
FIG. 4 is a sectional view of the leg shield according to the first preferred embodiment shown in FIG. 2 taken along the line 100-100.

A radiator 20 for cooling the engine 6 is preferably provided above the front side of the cylinder 6a of the four-cycle engine 6 at the back of the front fender 17. The radiator 20 is mounted on the mainframe 3. The radiator 20 is an example of a "heat exchanger" mentioned in the description of preferred embodiments of the present invention. As shown in FIG. 4, the radiator 20 preferably includes a pair of tank members 20a spaced from each other by a predetermined interval extending along the lateral direction (direction A in FIG. 4) of the motorcycle 1 and the radiator 20 also includes a core member 20b arranged between the pair of tank members 20a. Further, the radiator 20 is connected to the engine 6 preferably by a supply pipe 21 and a return pipe 22, as shown in FIG. 1.

In order to cool the engine 6 with the radiator 20, a coolant that is warmed by cooling the engine 6 is fed to the first tank member 20a of the radiator 20 through the supply pipe 21. The warmed coolant is cooled by the core member 20b of the radiator 20 and thereafter fed to the second tank member 20a of the radiator 20. The cooled coolant is returned to the engine 6 through the return pipe 22. The core member 20b of the radiator 20 blows running wind (air) 61 to the core member 20b from the front portion and passes the running wind through the core member 20b thereby cooling (radiating heat from) the coolant when the motorcycle 1 is in motion.

Figure 2:
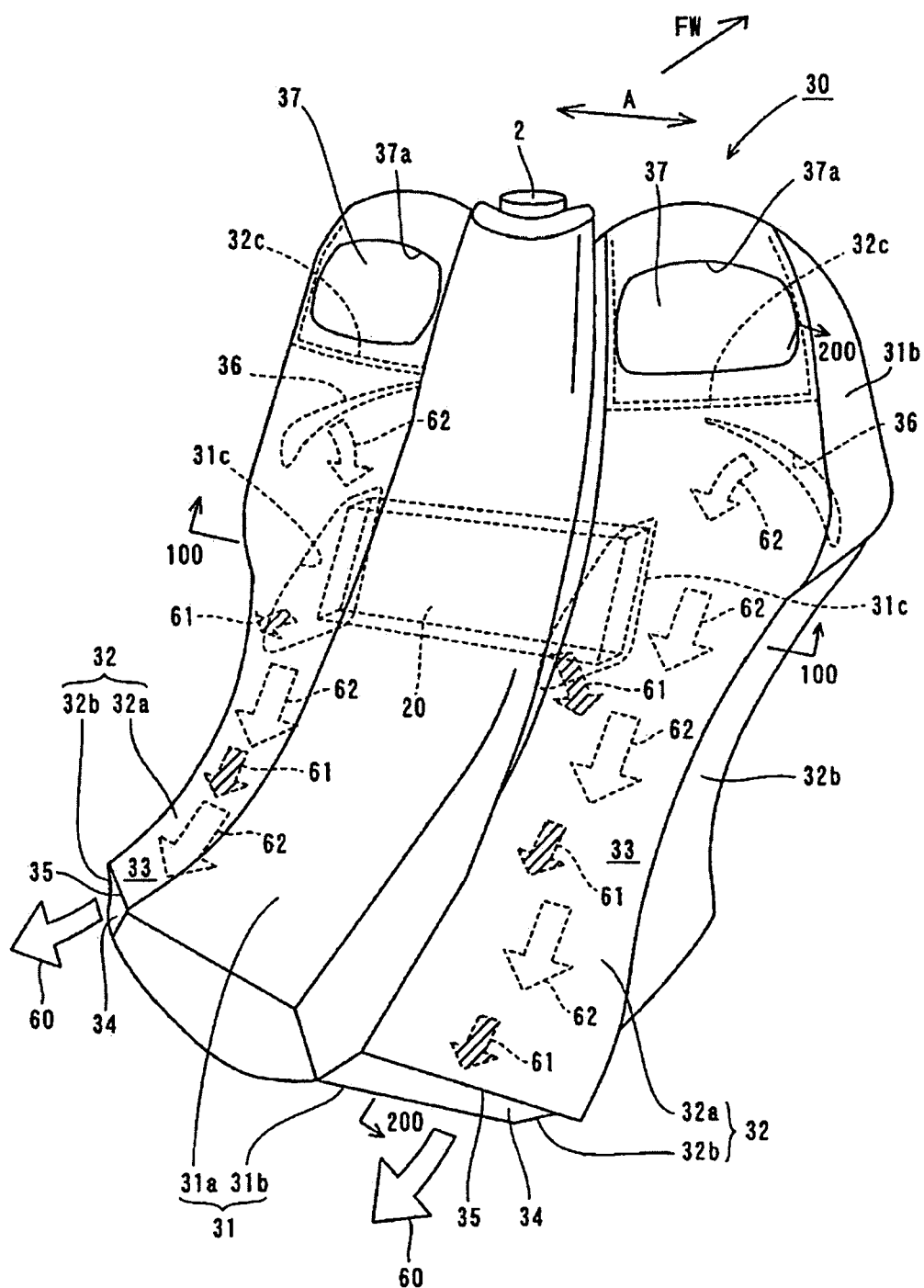
FIG. 2 is a perspective view of a leg shield of the motorcycle according to the first preferred embodiment shown in FIG. 1.
Figure 3:
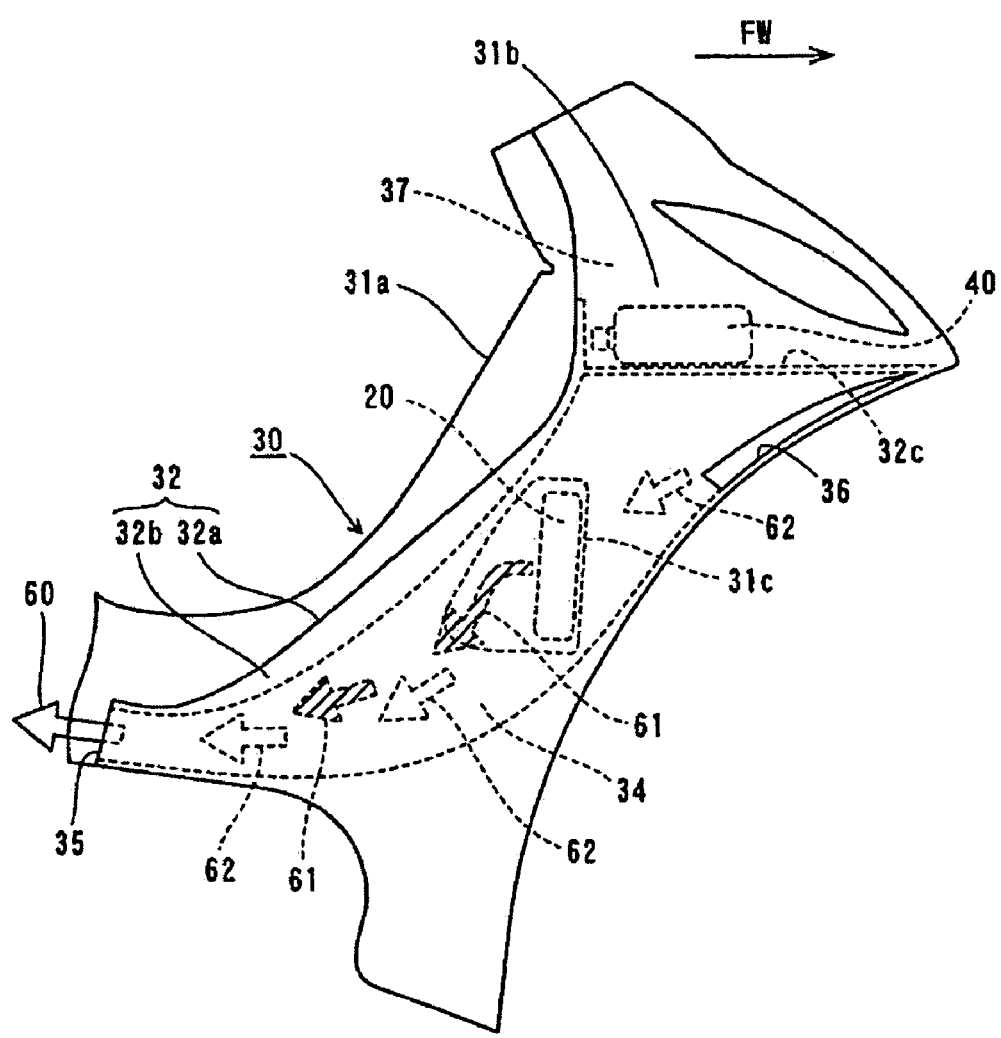
FIG. 3 is a side elevational view of the leg shield of the motorcycle according to the first preferred embodiment shown in FIG. 1.

According to the first preferred embodiment, a leg shield 30 is arranged to cover the head pipe 2 and the mainframe 3, as shown in FIG. 1. The leg shield 30 is arranged to cover the front sides of the legs 50a of the driver 50 riding the motorcycle 1. The leg shield 30 and the rear cowl 15 constitute a body cover. The leg shield 30 constitutes wind guide spaces 33 (see FIG. 2) arranged at the back of the radiator 20 for guiding the air 61 passing through the radiator 20. As shown in FIGS. 2 and 3, the leg shield 30 preferably includes a first cover member 31 and a pair of second cover members 32 formed independently of the first cover member 31 and arranged on both sides of the first cover member 31. The first cover member 31 and the second cover members 32 form the wind guide spaces 33.

Figure 5:
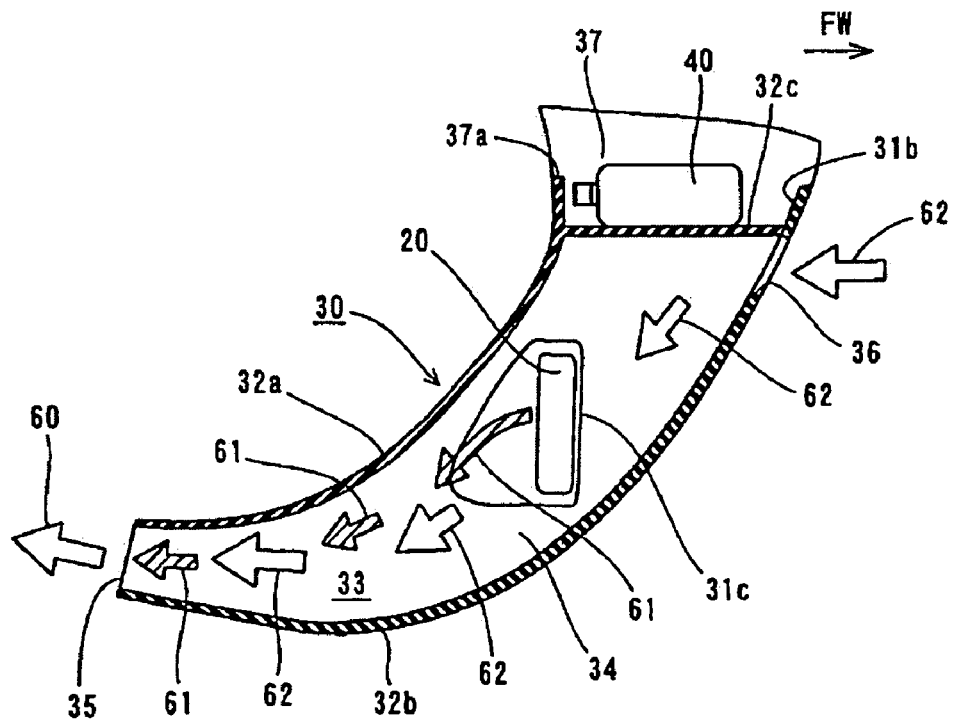
FIG. 5 is a sectional view of the leg shield according to the first preferred embodiment shown in FIG. 2 taken along the line 200-200.
Figure 6:
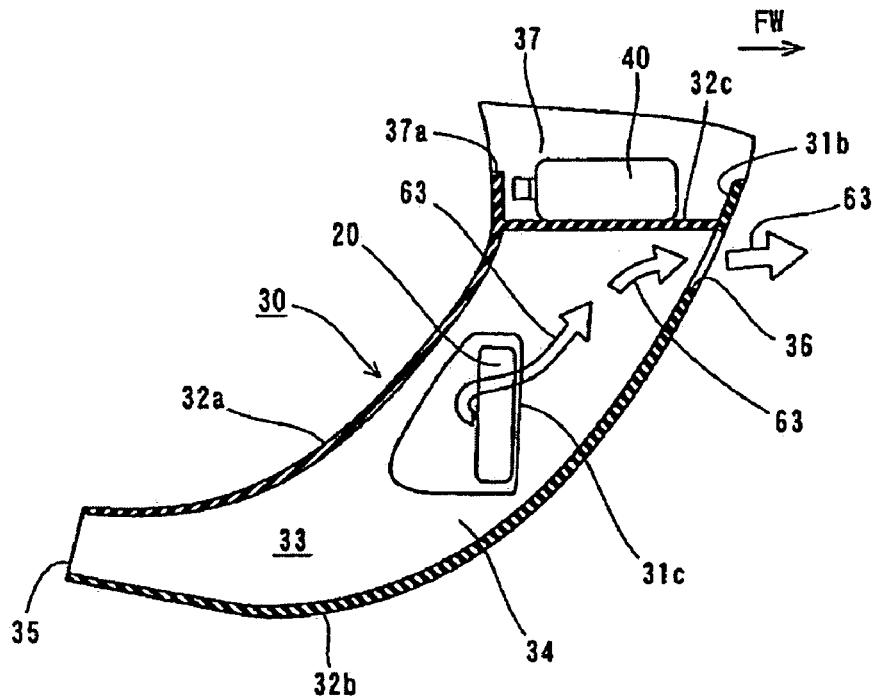
FIG. 6 is a sectional view for illustrating a heat radiating operation for a radiator performed in the leg shield according to the first preferred embodiment shown in FIG. 5 when the motorcycle comes to a halt.

The first cover member 31 preferably includes an outer cover member 31a located on a side closer to the driver 50 (see FIG. 1) behind the radiator 20 and inner cover members 31b formed continuously with the outer cover member 31a to extend from behind the radiator 20 toward front portions through side portions, as shown in FIGS. 2 and 4. The inner cover members 31b are provided with openings 31c in the form of holes for guiding the air 61 passing through the radiator 20 to the wind guide spaces 33 on portions, close to the radiator 20, located along the rear portion and the side portions of the radiator 20. The openings 31c are examples of the "first opening" mentioned in the description of preferred embodiments the present invention. As shown in FIGS. 2 and 5, the inner cover members 31b are provided with inlets 36 in the form of holes opening toward the front portion of the motorcycle 1 above the openings 31c and the radiator 20 in the vicinity of the upper ends of the wind guide spaces 33. The inlets 36 are examples of the "third opening" mentioned in the description of preferred embodiments of the present invention. The inlets 36 are arranged to extend in the lateral direction (direction A in FIG. 2) of the motorcycle 1. The inlets 36 introduce running wind (air) 62 into the wind guide spaces 33 when the motorcycle 1 is in motion, as seen in FIG. 5. The inlets also radiate heat 63 introduced into the wind guide spaces 33 from the radiator 20 through the openings 31c when the motorcycle 1 comes to a halt, as seen in FIG. 6. The inlets 36 are arranged above the openings 31c and the radiator 20 in the vicinity of the upper ends of the wind guide spaces 33 so that the heat 63 can be easily radiated from the radiator 20 through the inlets 36 since the heat 63 is easily transmitted upward as shown in FIG. 6.

As shown in FIGS. 1 and 5, outlets 35 for discharging the cooling wind (air) 61, passing through the radiator 20, guided by the openings 31c and the running wind (air) 62 introduced through the inlets 36 from the wind guide spaces 33 are provided on the lower ends of the wind guide spaces 33. The outlets 35 are examples of the "second opening" mentioned in the description of preferred embodiments of the present invention. The outlets 35 are arranged above the footrests 14 inside the shanks of the driver 50 behind his/her heels, as shown in FIG. 1. Thus, the outlets 35 discharge air 60 from behind the heels of the driver 50, thereby preventing the warm air 61 (see FIG. 2) which is passing through the radiator 20 from directly hitting the heels of the driver 50. Therefore, the driver 50 can enjoy a comfortable riding state, and is not subjected to or affected by overheating of the engine resulting from the warm air 61 passing through the radiator 20 and hitting the heels of the driver 50.

As shown in FIG. 5, portions of the wind guide spaces 33 reaching the outlets 35 from the inlets 36 constitute wind guide paths 34 for discharging the air 62, which is introduced from the inlets 36 to pass through the wind guide spaces 33, from the outlets 35. The openings 31c for guiding the air 61 passing through the radiator 20 to the wind guide spaces 33 are preferably provided on intermediate portions of the wind guide paths 34.

The pair of second cover members 32 include rear cover members 32a arranged on the sides closer to the legs 50a of the driver 50 (see FIG. 1) and side cover members 32b arranged on outer sides of the rear cover members 32a, as shown in FIGS. 2 and 4. Further, longitudinally extending upper surface members 32c are provided on the upper portions of the rear cover members 32a, as shown in FIG. 5. The upper surface members 32c of the rear cover members 32a and the rear surfaces of the inner cover members 31b of the first cover member 31 form stowage spaces 37. Thus, according to the first preferred embodiment, it is possible to form the stowage spaces 37 by utilizing portions of the first cover member 31 and the second cover members 32 not used for the wind guide paths 34. Refresher containers 40 are preferably stowed in the stowage spaces 37, for example. Openings 37a (see FIG. 2) of the stowage spaces 37 may be covered with openable/closable lids. As shown in FIG. 3, the radiator 20 is preferably arranged under the upper surface members 32c of the rear cover members 32a in front of the rear cover members 32a. Thus, it is possible to reliably provide the space for locating and installing the radiator 20 without damaging the functions of the leg shield 30.

The rear cover members 32a of the second cover members 32 are examples of the "second wall member" mentioned in the description of preferred embodiments of the present invention, the upper surface members 32c of the rear cover members 32a of the second cover members 32 are examples of the "first wall member" mentioned in the description of preferred embodiments of the present invention, and the inner cover members 31b of the first cover member 31 are examples of the "third wall member" mentioned in the description of preferred embodiments of the present invention. Further, the outer cover member 31a and the inner cover members 31b of the first cover member 31 and the rear cover members 32a and the side cover members 32b of the second cover members 32 are examples of the "wall member of the leg shield" mentioned in the description of preferred embodiments of the present invention.

According to the first preferred embodiment, as described above, the first cover member 31 and the second cover members 32 constituting the leg shield 30 define the wind guide spaces 33 while providing the openings 31c for guiding the air 61 passing through the radiator 20 to the wind guide spaces 33 and the outlets 35 for discharging the air 61, passing through the radiator 20, guided by the opening 31c from the wind guide spaces 33 so that no members (wind guide members) forming the wind guide spaces 33 may be provided independently of the leg shield 30. As a result of this unique construction, the structure including the wind guide members for guiding the air 61 passing through the radiator 20 and the leg shield 30 is greatly simplified.

According to the first preferred embodiment, as described above, the leg shield 30 is provided with the inlets 36 opening toward the front portion of the motorcycle 1 while the openings 31c are provided on the intermediate portions of the wind guide paths 34 for discharging the air 62, which is introduced from the inlets 36 to pass through the wind guide spaces 33, from the outlets 35 so that the air 61 remaining behind the radiator 20 can be exhausted from the openings 31c through the streams of the air 62 flowing from the inlets 36 toward the outlets 35 when the motorcycle 1 is in motion. Thus, the flow rate of the air 61 introduced into the wind guide spaces 33 from behind the radiator 20 can be increased so as to increase the flow rate of the air 61 passing through the radiator 20.

Consequently, the cooling capability of the radiator 20 is greatly improved. Further, the air 61, which is warmed by the radiator 20, introduced into the wind guide spaces 33 from behind the radiator 20 is mixed with the air 62 introduced from the inlets 36 to be reduced in temperature, whereby the temperature of the air 60 discharged from the outlets 35 is greatly reduced. Thus, the warm air 61 can be prevented from hitting the driver 50 and because the significantly reduced temperature air 60 discharged from the outlets 35 hits the driver 50, the driver 50 enjoys a comfortable riding state.

According to the first preferred embodiment, the inlets 36 are arranged to introduce the air 62 into the wind guide spaces 33 when the motorcycle 1 is in motion and are arranged discharge the heat 63 introduced from the radiator 20 into the wind guide spaces 33 through the openings 31c when the motorcycle 1 comes to a halt. As a result of this unique arrangement, it is possible to exhaust the air 61 remaining behind the radiator 20 from the openings 31c and discharge the same from the outlets 35 through the streams of the air 62 flowing from the inlets 36 toward the outlets 35 when the motorcycle 1 is in motion and it is also possible to discharge the heat 63 from the radiator 20 through the inlets 36 when the motorcycle 1 comes to a halt. Thus, it is possible to excellently radiate heat from the radiator 20 not only when the motorcycle 1 is in motion but also when the motorcycle 1 comes to a halt, whereby the cooling capability of the radiator 20 is further improved.

According to the first preferred embodiment, further, the inlets 36 are arranged to extend in the lateral direction (direction A in FIG. 2) of the motorcycle 1 so that the running wind (air) 62 can be introduced from the inlets 36 in wide areas along the lateral direction of the motorcycle 1 when the motorcycle 1 is in motion, whereby the flow rate of the air 62 flowing from the inlets 36 toward the outlets 35 can be increased.

Figure 7:
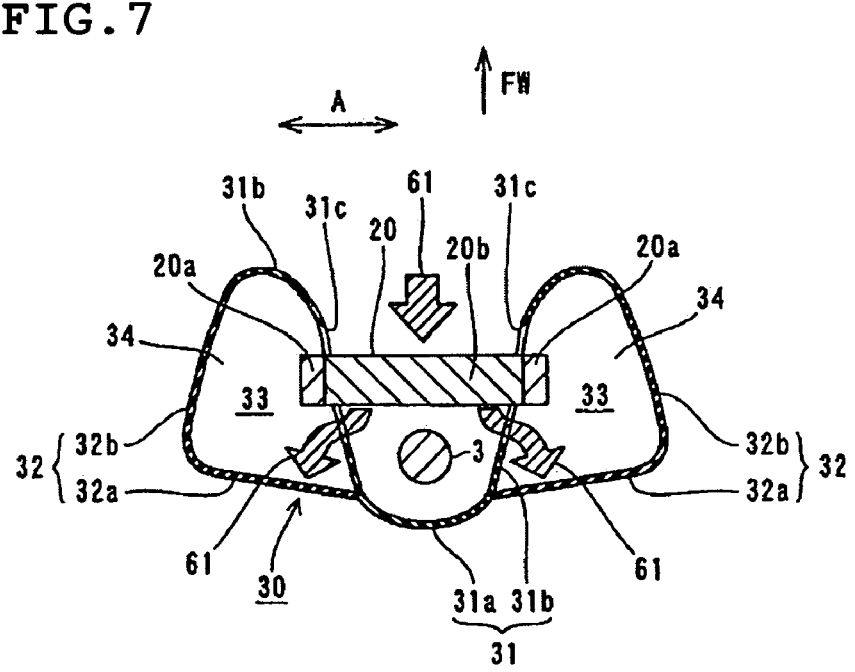
FIG. 7 is a sectional view showing a leg shield of a motorcycle according to a modification of the first preferred embodiment of the present invention.

A modification of the first preferred embodiment of the present invention is now described with reference to FIG. 7. According to this modification of the first preferred embodiment, both of a pair of tank members 20a of a radiator 20 spaced from each other by a predetermined distance extending along the lateral direction (direction A in FIG. 7) of a motorcycle 1 are arranged in wind guide spaces 33 through openings 31c, unlike the above-described first preferred embodiment. Thus, the length of a leg shield 30 along the lateral direction (direction A in FIG. 7) can be reduced due to the pair of tank members 20a of the radiator 20 being arranged in the wind guide spaces 33 through the openings 31c. Therefore, the leg shield 30 can be prevented from being enlarged in the lateral direction (direction A in FIG. 7), whereby the length of the motorcycle 1 along the lateral direction (direction A in FIG. 7) can be prevented from increasing. According to this modification of the first preferred embodiment, further, the pair of tank members 20a of the radiator 20 are arranged in the wind guide spaces 33 through the openings 31c so that air 61 passing through the radiator 20 can be more easily guided into the wind guide spaces 33 from the openings 31c. In this modification of the first preferred embodiment, only one of the pair of tank members 20a may alternatively be arranged in either wind guide space 33.

Second Preferred Embodiment

A second preferred embodiment of the present invention is now described with reference to FIGS. 8 to 12. The second preferred embodiment is described with reference to an example including a leg shield 130 having a structure that is different from that in the first preferred embodiment while providing ribs 131b and 131c projecting toward a radiator 20 on edges of openings 131a of the leg shield 130.

Figure 8:
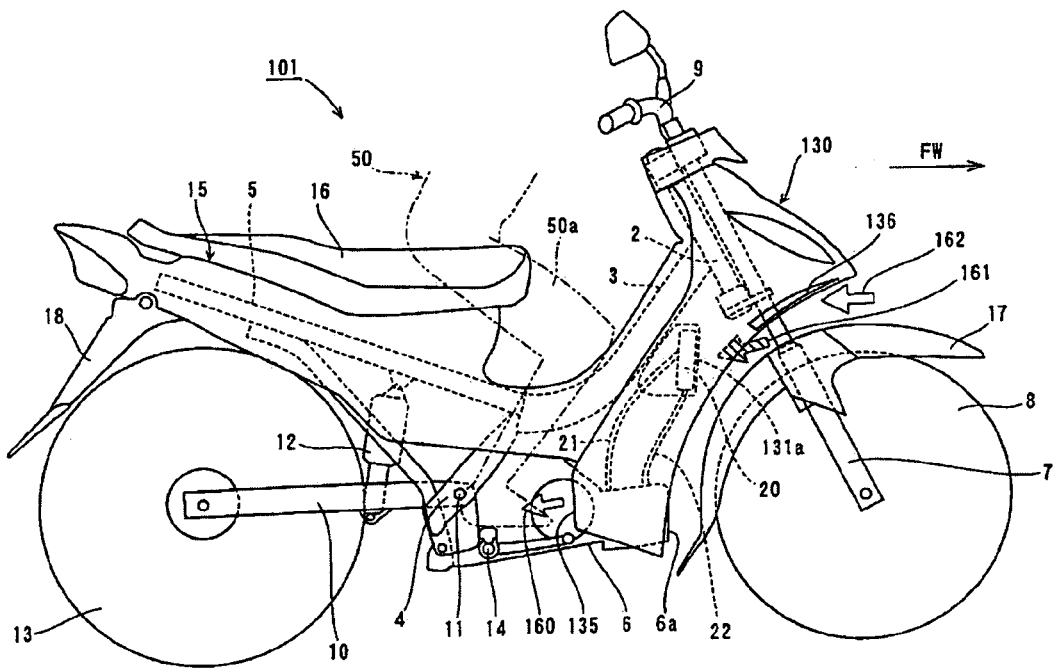
FIG. 8 is a side elevational view of a motorcycle according to a second preferred embodiment of the present invention.
Figure 9:
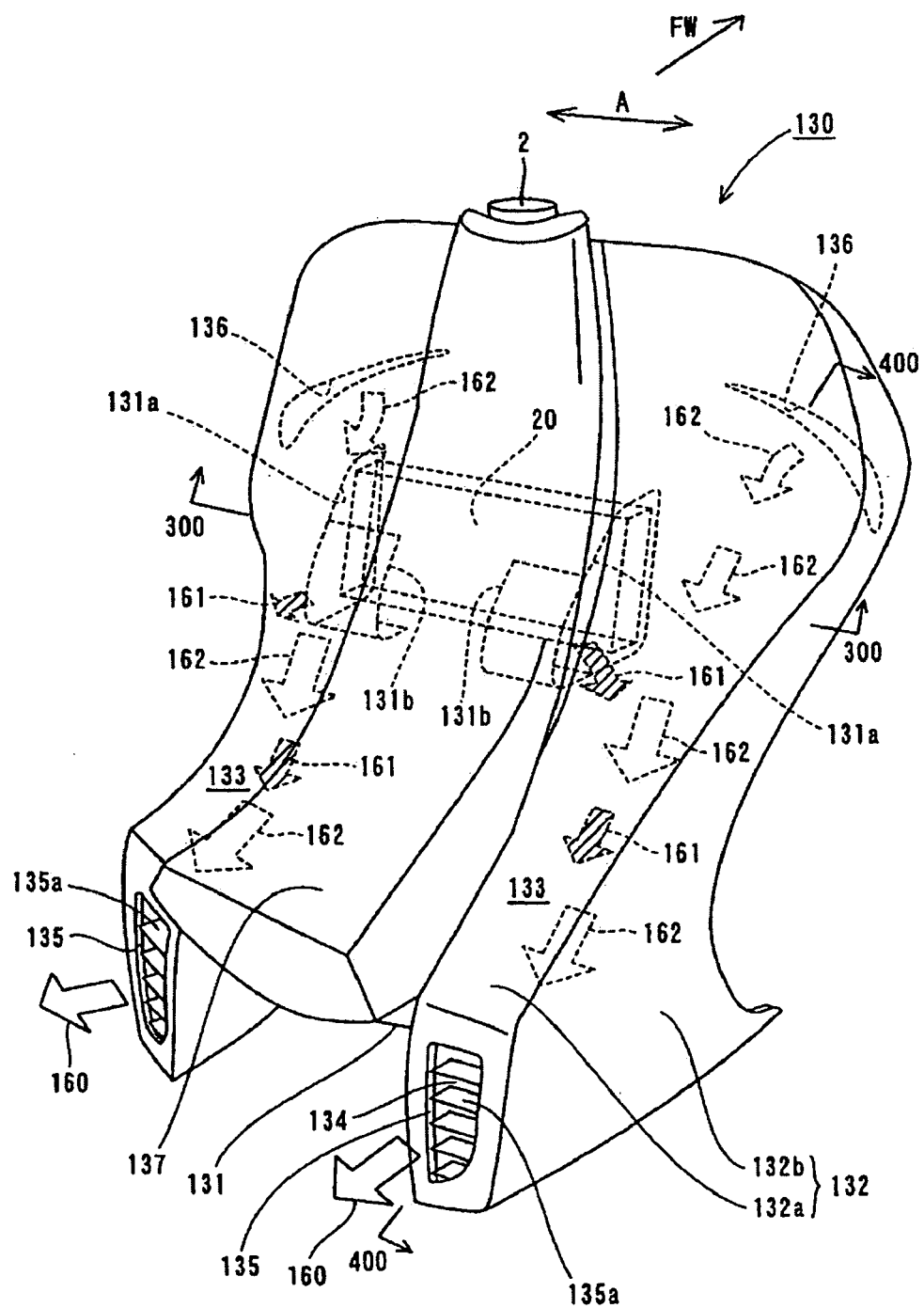
FIG. 9 is a perspective view of a leg shield of the motorcycle according to the second preferred embodiment shown in FIG. 8.

In a motorcycle 101 according to the second preferred embodiment shown in FIG. 8, the structures of portions other than the leg shield 130 are preferably similar to those of the motorcycle 1 according to the first preferred embodiment shown in FIG. 1. The leg shield 130 according to the second preferred embodiment preferably includes a pair of first cover members 131 spaced from each other by a predetermined distance extending along the lateral direction (direction A in FIGS. 9 and 10) of the motorcycle 101, a pair of second cover members 132 formed independently of the first cover members 131 for defining wind guide spaces 133 between the same and the pair of first cover members 131, respectively, and a third cover member 137 formed independently of the first cover members 131 and the second cover members 132 and arranged between the pair of second cover members 132, as shown in FIGS. 9 and 10.

Figure 10:
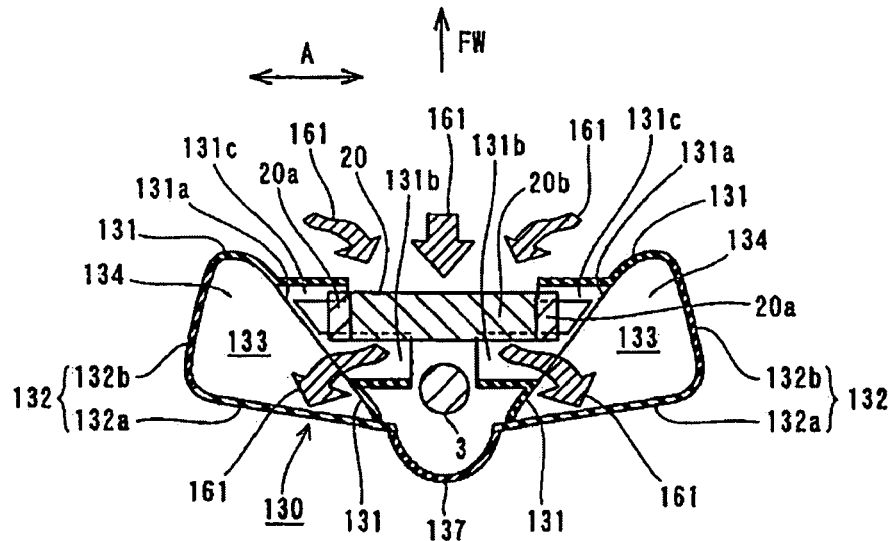
FIG. 10 is a sectional view of the leg shield according to the second preferred embodiment shown in FIG. 9 taken along the line 300-300.

The first cover members 131 are arranged to extend from behind the radiator 20 toward front portions through side portions, as shown in FIG. 10. The first cover members 131 are provided with openings 131a in the form of holes arranged to introduce air 161 passing through the radiator 20 into the wind guide spaces 133 on portions close to the radiator 20, located along the rear portion and the side portions of the radiator 20. The openings 131a are examples of the "first opening" mentioned in the description of preferred embodiments of the present invention.

Figure 11:
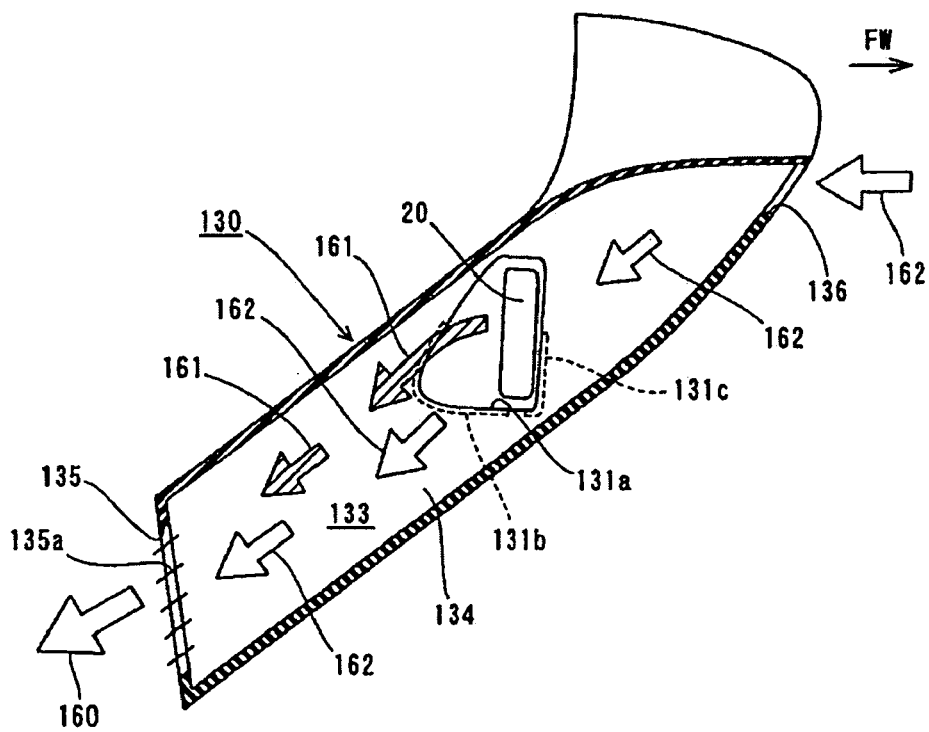
FIG. 11 is a sectional view of the leg shield according to the second preferred embodiment shown in FIG. 9 taken along the line 400-400.

According to the second preferred embodiment, the first cover members 131 are integral with the ribs 131b projecting from edges of the openings 131a toward the rear side and the lower side of the radiator 20 and the ribs 131c projecting from the edges of the openings 131a toward the front side of the radiator 30, as shown in FIGS. 10 and 11. The ribs 131b and the ribs 131c are examples of the "first rib" and the "second rib" mentioned in the description of preferred embodiments of the present invention, respectively. The ribs 131b are arranged to cover portions of tank members 20a located on the rear side and the lower side of the radiator 20 and portions of a core member 20b, as shown in FIG. 10. The ribs 131b are arranged to guide the cooling wind (air) 161 passing through the radiator 20 to the openings 131a when the motorcycle 101 is in motion and to guide heat 163 from the radiator 20 to the openings 131a when the motorcycle 101 comes to a halt. Further, the ribs 131c are arranged to cover the portions of the tank members 20a located on the front side of the radiator 20. The ribs 131c are arranged to guide the air 161 directed toward the tank members 20a of the radiator 20 to the core member 20b when the motorcycle 101 is in motion.

Figure 12:
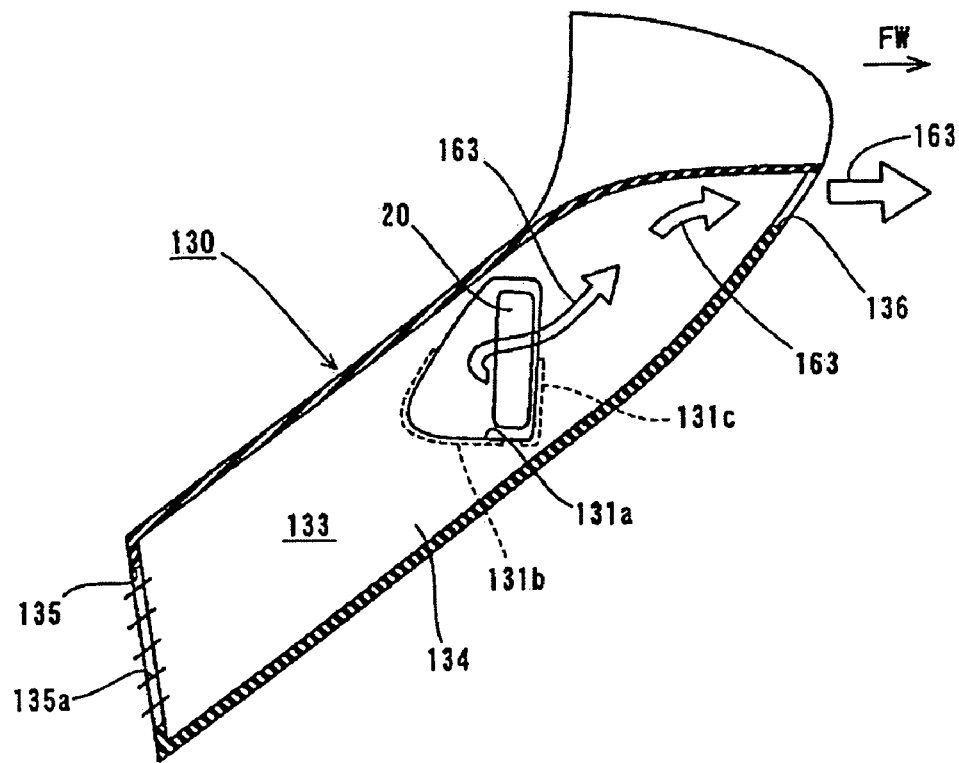
FIG. 12 is a sectional view for illustrating a heat radiating operation for a radiator performed in the leg shield according to the second preferred embodiment shown in FIG. 11 when the motorcycle comes to a halt.

As shown in FIG. 11, inlets 136 in the form of holes connected to the wind guide spaces 133 are provided above the openings 131a and the radiator 20 in the vicinity of the upper ends of the wind guide spaces 133. The inlets 136 are examples of the "third opening" mentioned in the description of preferred embodiments of the present invention. The inlets 136 are arranged to extend in the lateral direction (direction A in FIG. 9). Further, the inlets 136 are arranged to introduce air 162 into the wind guide spaces 133 when the motorcycle 101 is in motion, as seen in FIG. 11, and are arranged to discharge the heat 163 introduced from the radiator 20 into the wind guide spaces 133 through the openings 131a when the motorcycle 101 comes to a halt, as seen in FIG. 12. The inlets 136 are arranged above the openings 131a and the radiator 20 in the vicinity of the upper ends of the wind guide spaces 133 so that it is possible to discharge the heat 163 from the radiator 20 through the inlets 136 since the heat 136 is easily transmitted upward.

Outlets 135 in the form of holes for discharging the air 161, passing through the radiator 20, guided by the openings 131a and the air 162 introduced through the inlets 136 from the wind guide spaces 133 are provided on the lower ends of the wind guide spaces 133, as shown in FIG. 11. The outlets 135 are examples of the "second opening" mentioned in the description of preferred embodiments of the present invention. According to the second preferred embodiment, the outlets 135 are arranged in front of the legs 50a of a driver 50 (see FIG. 8), unlike the aforementioned first preferred embodiment. In other words, the air 160 discharged from the outlets 135 directly hits the legs 50a of the driver 50 according to the second preferred embodiment, as shown in FIG. 8. The outlets 135 are provided with a plurality of louvers 135a for controlling the direction for discharging the air 160, as shown in FIGS. 9 and 11.

As shown in FIG. 11, portions of the wind guide spaces 133 extending to the outlets 135 from the inlets 136 constitute wind guide paths 134 for discharging the air 162, introduced from the inlets 136 to pass through the wind guide spaces 133, from the outlets 135. The openings 131a for introducing the air 161 passing through the radiator 20 into the wind guide spaces 133 are provided on intermediate portions of the wind guide paths 134.

The second cover members 132 include rear cover members 132a arranged on the sides of the legs 50a of the driver 50 (see FIG. 8) and side cover members 132b arranged on outer sides of the rear cover members 132a, as shown in FIGS. 9 and 10. The first cover members 131 and the rear cover members 132a and the side cover members 132b of the second cover members 132 are examples of the "wall member of the leg shield" mentioned in the description of preferred embodiments of the present invention.

According to the second preferred embodiment, the first cover members 131 and the second cover members 132 constituting the leg shield 130 define the wind guide spaces 133 while providing the openings 131a for guiding the air 161 passing through the radiator 20 to the wind guide spaces 133 and the outlets 135 for discharging the air 161, passing through the radiator 20, guided by the openings 131a from the wind guide spaces 133 so that no members (wind guide members) forming the wind guide spaces 133 may be provided independently of the leg shield 130 similarly to the aforementioned first preferred embodiment. As a result of this unique construction, the structure of a portion including the wind guide members for guiding the air 161 passing through the radiator 20 and the leg shield 130 is greatly simplified.

According to the second preferred embodiment, further, the leg shield 130 is provided with the inlets 136 while the openings 131a are provided on the intermediate portions of the wind guide paths 134 for discharging the air 162, introduced from the inlets 136 to pass through the wind guide spaces 133, from the outlets 135 so that the air 161 remaining behind the radiator 20 can be exhausted from the openings 131a through the streams of the air 62 flowing from the inlets 136 toward the outlets 135 when the motorcycle 101 is in motion, whereby the flow rate of the air 161 introduced into the wind guide spaces 133 from behind the radiator 20 is greatly increased. Thus, the flow rate of the air 161 passing through the radiator 20 can be increased so that the cooling capability of the radiator 20 is greatly improved, similarly to the aforementioned first preferred embodiment. Further, the air 161, warmed by the radiator 20, introduced into the wind guide spaces 133 from behind the radiator 20 is mixed with the air 162 introduced from the inlets 136 to be reduced in temperature, whereby the temperature of the air 160 discharged from the outlets 135 can be reduced. Thus, the warm air 161 can be prevented from hitting the driver 50 when the air 160 discharged from the outlets 135 directly hits the legs 50a of the driver 50 (see FIG. 8), whereby the driver 50 can enjoy a comfortable riding state.

According to the second preferred embodiment, as described above, the ribs 131b projecting from the edges of the openings 131a to cover the portions of the tank members 20a located on the rear side of the radiator 20 and the core member 20b are arranged such that the air 161 passing through the radiator 20 is smoothly guided to the openings 131a when the motorcycle 101 is in motion, whereby the flow rate of the air 161 passing through the radiator 20 to be introduced into the wind guide spaces 133 is increased even more. When the motorcycle 101 comes to a halt, the heat 163 (see FIG. 12) is smoothly guided from the radiator 20 to the openings 131a through the ribs 131b, whereby heat radiation is performed superbly. Consequently, the cooling capability of the radiator 20 is even further improved.

According to the second preferred embodiment, as described above, the ribs 131c projecting from the edges of the openings 131a to cover the portions of the tank members 20a located on the front side of the radiator 20 are arranged such that the air 161 directed toward the tank members 20a of the radiator 20 can be guided to the core member 20b when the motorcycle 101 is in motion, whereby the flow rate of the air 161 hitting the core member 20b of the radiator 20 is greatly increased. As a result, the cooling capability of the radiator 20 is greatly improved.

The remaining effects and advantages of the second preferred embodiment are similar to those of the aforementioned first preferred embodiment.

The preferred embodiments described above are illustrative and not restrictive in all points. The scope of the present invention is not determined by the above description of the preferred embodiments but by the scope of the claims, and all modifications in the meaning and range equivalent to the scope of the claims are included.

While the preferred embodiments have been described with reference to motorcycles as examples of the vehicle according to the present invention, the present invention is not restricted to this but is also similarly applicable to other vehicles such as a tricycle and an ATV (all terrain vehicle: vehicle for running on irregular ground) other than the motorcycle.

While the openings, the inlets and the outlets are preferably defined by holes in the preferred embodiments described herein, the present invention is not restricted to this. Any of the openings, the inlets and the outlets may alternatively be defined by notches.

While the wind guide paths are preferably provided on both horizontal sides in the preferred embodiments described herein, the present invention is not restricted to this but the wind guide paths may alternatively be provided only on either horizontal side.

While the radiators are preferably included in the preferred embodiments described herein as examples of the heat exchanger, the present invention is not restricted to this but a heat exchanger other than a radiator may alternatively be included. For example, an oil cooler for cooling lubricating oil may alternatively be used.

While the first cover members and the second cover members including different members are combined with each other to form the wind guide spaces in the preferred embodiments described herein, the present invention is not restricted to this but the wind guide spaces may alternatively be formed by integrally forming the first cover members and the second cover members.

While the upper surface members 32c constituting the stowage spaces 37 are preferably integrally provided with the rear cover members 32a of the second cover members 32 in the first preferred embodiment, the present invention is not restricted to this. The upper surface members 32c may alternatively be integrally provided with the first cover member 31, or the upper surface members 32c may alternatively be provided independently of the first cover member 31 and the second cover members 32.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

The invention claimed is:

1. A vehicle comprising:
   a leg shield arranged to cover front portions of legs of a driver riding the vehicle and including a wall member; and
   a heat exchanger arranged on a front surface side of said leg shield; wherein said leg shield includes:
   a wind guide space defined by said wall member of said leg shield;
   a first opening formed in a portion of said wall member of said leg shield located at least behind said heat exchanger and said first opening being arranged to guide air passing through said heat exchanger to said wind guide space;
   a second opening formed in another portion of said wall member of said leg shield that is separated from said first opening by a distance and said second opening being arranged to discharge air that passes through said heat exchanger and is guided to said first opening from said wind guide space;
   a third opening connected to said wind guide space and opening toward a front portion of the vehicle; wherein
   said first opening is provided on an intermediate portion of a wind guide path for discharging air that is introduced from said third opening to pass through said wind guide space from said second opening; and
   the air introduced into said third opening is initially independent from the air passing through the heat exchanger and then the air introduced into said third opening and the air passing through the heat exchanger is mixed together in the wind guide space.

2. The vehicle according to claim 1, wherein said third opening is arranged to introduce air into said wind guide space when the vehicle is in motion and is arranged to discharge heat, which is introduced from said heat exchanger into said wind guide space, through said first opening when said vehicle comes to a halt.

3. The vehicle according to claim 1, wherein said second opening is arranged under said first opening.

4. The vehicle according to claim 1, wherein said third opening is arranged to extend in a lateral direction of the vehicle.

5. The vehicle according to claim 2, wherein said third opening is provided above said first opening and said heat exchanger near an upper end of said wind guide space.

6. A vehicle comprising:
   a leg shield arranged to cover front portions of legs of a driver riding the vehicle and including a wall member;
   a heat exchanger arranged on a front surface side of said leg shield; wherein
   said leg shield includes:
   a wind guide space defined by said wall member of said leg shield;
   a first opening formed in a portion of said wall member of said leg shield located at least behind said heat exchanger and said first opening being arranged to guide air passing through said heat exchanger to said wind guide space;
   a second opening formed in another portion of said wall member of said leg shield that is separated from said first opening by a distance and said second opening being arranged to discharge air that passes through said heat exchanger and is guided to said first opening from said wind guide space;
   a third opening connected to said wind guide space and opening toward a front portion of the vehicle; and
   a first rib provided on the wall member of said leg shield and arranged to project from an edge of said first opening to cover at least a rear portion of said heat exchanger; wherein
   said first opening is provided on an intermediate portion of a wind guide path for discharging air that is introduced from said third opening to pass through said wind guide space from said second opening; and
   the air introduced into said third opening is initially independent from the air passing through the heat exchanger and then the air introduced into said third opening and the air passing through the heat exchanger is mixed together in the wind guide space.

7. The vehicle according to claim 6, wherein said heat exchanger includes a pair of tank members spaced from each other along a lateral direction of the vehicle and a core member arranged between said pair of tank members, the vehicle including a second rib provided on the wall member of said leg shield and arranged to project from the edge of said first opening to cover front portions of the pair of tank members of said heat exchanger.

8. A vehicle comprising:
   a leg shield arranged to cover front portions of legs of a driver riding the vehicle and including a wall member; and
   a heat exchanger arranged on a front surface side of said leg shield; wherein
   said leg shield includes:
   a wind guide space defined by said wall member of said leg shield;
   a first opening formed in a portion of said wall member of said leg shield located at least behind said heat exchanger and said first opening being arranged to guide air passing through said heat exchanger to said wind guide space;
   a second opening formed in another portion of said wall member of said leg shield that is separated from said first opening by a distance and said second opening being arranged to discharge air that passes through said heat exchanger and is guided to said first opening from said wind guide space;
   a third opening connected to said wind guide space and opening toward a front portion of the vehicle; wherein
   said first opening is provided on an intermediate portion of a wind guide path for discharging air that is introduced from said third opening to pass through said wind guide space from said second opening;
   the air introduced into said third opening is initially independent from the air passing through the heat exchanger and then the air introduced into said third opening and the air passing through the heat exchanger is mixed together in the wind guide space; and said leg shield includes:
a first cover member arranged at least behind said heat exchanger; and
a second cover member defining at least a portion of said wind guide space.

9. The vehicle according to claim 8, wherein said second cover member includes a rear cover member arranged on a side of the legs of said driver and a side cover member arranged on an outer side of said rear cover member.

10. The vehicle according to claim 8, wherein said first opening is formed in said first cover member.

11. The vehicle according to claim 8, wherein said leg shield includes an upper surface member disposed on at least one of said first cover member and said second cover member and arranged to extend in a longitudinal direction, and a stowage space is provided on said upper surface member.

12. A vehicle comprising:
a leg shield arranged to cover front portions of legs of a driver riding the vehicle and including a wall member; and
a heat exchanger arranged on a front surface side of said leg shield; wherein
said leg shield includes:
a wind guide space defined by said wall member of said leg shield;
a first opening formed in a portion of said wall member of said leg shield located at least behind said heat exchanger and said first opening being arranged to guide air passing through said heat exchanger to said wind guide space;
a second opening formed in another portion of said wall member of said leg shield that is separated from said first opening by a distance and said second opening being arranged to discharge air that passes through said heat exchanger and is guided to said first opening from said wind guide space;
a third opening connected to said wind guide space and opening toward a front portion of the vehicle; wherein
said first opening is provided on an intermediate portion of a wind guide path for discharging air that is introduced from said third opening to pass through said wind guide space from said second opening;
the air introduced into said third opening is initially independent from the air passing through the heat exchanger and then the air introduced into said third opening and the air passing through the heat exchanger is mixed together in the wind guide space; and
said third opening is provided in front of said heat exchanger.

13. A vehicle comprising:
a leg shield arranged to cover front portions of legs of a driver riding the vehicle and including a wall member; and
a heat exchanger arranged on a front surface side of said leg shield; wherein
said leg shield includes:
a wind guide space defined by said wall member of said leg shield;
a first opening formed in a portion of said wall member of said leg shield located at least behind said heat exchanger and said first opening being arranged to guide air passing through said heat exchanger to said wind guide space;
a second opening formed in another portion of said wall member of said leg shield that is separated from said first opening by a distance and said second opening being arranged to discharge air that passes through said heat exchanger and is guided to said first opening from said wind guide space;
a third opening connected to said wind guide space and opening toward a front portion of the vehicle; wherein
said first opening is provided on an intermediate portion of a wind guide path for discharging air that is introduced from said third opening to pass through said wind guide space from said second opening; and
the air introduced into said third opening is initially independent from the air passing through the heat exchanger and then the air introduced into said third opening and the air passing through the heat exchanger is mixed together in the wind guide space; and
said heat exchanger is arranged to extend in a lateral direction of the vehicle,
said leg shield includes a first cover member arranged to extend from a rear portion of said heat exchanger toward a front portion of said heat exchanger through a side portion to at least partially constitute said wind guide space, and said first opening is formed in said first cover member and the heat exchanger extending in the lateral direction of said vehicle is partially arranged in said wind guide space through said first opening.

14. The vehicle according to claim 13, wherein said heat exchanger includes:
a pair of tank members spaced from each other in a lateral direction of the vehicle; and
a core member arranged between said pair of tank members; wherein
at least one of said pair of tank members is arranged in said wind guide space through said first opening.

15. A vehicle comprising:
a leg shield arranged to cover front portions of legs of a driver riding the vehicle and including a wall member; and
a heat exchanger arranged on a front surface side of said leg shield; wherein
said leg shield includes:
a wind guide space defined by said wall member of said leg shield;
a first opening formed in a portion of said wall member of said leg shield located at least behind said heat exchanger and said first opening being arranged to guide air passing through said heat exchanger to said wind guide space;
a second opening formed in another portion of said wall member of said leg shield that is separated from said first opening by a distance and said second opening being arranged to discharge air that passes through said heat exchanger and is guided to said first opening from said wind guide space;
a third opening connected to said wind guide space and opening toward a front portion of the vehicle; wherein
said first opening is provided on an intermediate portion of a wind guide path for discharging air that is introduced from said third opening to pass through said wind guide space from said second opening; and
air in the heat exchanger is exhausted via the first opening by way of streams of air flowing from said third opening toward said second opening.

16. The vehicle according to claim 15, wherein said third opening is arranged to introduce air into said wind guide space when the vehicle is in motion and is arranged to discharge heat, which is introduced from said heat exchanger into said wind guide space, through said first opening when said vehicle comes to a halt.

17. The vehicle according to claim 15, wherein said second opening is arranged under said first opening.

18. The vehicle according to claim 15, wherein said third opening is provided in front of said heat exchanger.

19. The vehicle according to claim 15, wherein said third opening is arranged to extend in a lateral direction of the vehicle.

20. The vehicle according to claim 16, wherein said third opening is provided above said first opening and said heat exchanger near an upper end of said wind guide space.

21. A vehicle comprising:
a leg shield arranged to cover front portions of legs of a driver riding the vehicle and including a wall member;
a heat exchanger arranged on a front surface side of said leg shield; wherein
said leg shield includes:
a wind guide space defined by said wall member of said leg shield;
a first opening formed in a portion of said wall member of said leg shield located at least behind said heat exchanger and said first opening being arranged to guide air passing through said heat exchanger to said wind guide space;
a second opening formed in another portion of said wall member of said leg shield that is separated from said first opening by a distance and said second opening being arranged to discharge air that passes through said heat exchanger and is guided to said first opening from said wind guide space;
a third opening connected to said wind guide space and opening toward a front portion of the vehicle; and
a first rib provided on the wall member of said leg shield and arranged to project from an edge of said first opening to cover at least a rear portion of said heat exchanger; wherein
said first opening is provided on an intermediate portion of a wind guide path for discharging air that is introduced from said third opening to pass through said wind guide space from said second opening; and
air in the heat exchanger is exhausted via the first opening by way of streams of air flowing from said third opening toward said second opening.

22. The vehicle according to claim 21, wherein said heat exchanger includes a pair of tank members spaced from each other along a lateral direction of the vehicle and a core member arranged between said pair of tank members, the vehicle including a second rib provided on the wall member of said leg shield and arranged to project from the edge of said first opening to cover front portions of the pair of tank members of said heat exchanger.

23. A vehicle comprising:
a leg shield arranged to cover front portions of legs of a driver riding the vehicle and including a wall member; and
a heat exchanger arranged on a front surface side of said leg shield; wherein
said leg shield includes:
a wind guide space defined by said wall member of said leg shield;
a first opening formed in a portion of said wall member of said leg shield located at least behind said heat exchanger and said first opening being arranged to guide air passing through said heat exchanger to said wind guide space;
a second opening formed in another portion of said wall member of said leg shield that is separated from said first opening by a distance and said second opening being arranged to discharge air that passes through said heat exchanger and is guided to said first opening from said wind guide space;
a third opening connected to said wind guide space and opening toward a front portion of the vehicle; wherein
said first opening is provided on an intermediate portion of a wind guide path for discharging air that is introduced from said third opening to pass through said wind guide space from said second opening;
air in the heat exchanger is exhausted via the first opening by way of streams of air flowing from said third opening toward said second opening; and
said leg shield includes:
a first cover member arranged at least behind said heat exchanger; and
a second cover member defining at least a portion of said wind guide space.

24. The vehicle according to claim 23, wherein said second cover member includes a rear cover member arranged on a side of the legs of said driver and a side cover member arranged on an outer side of said rear cover member.

25. The vehicle according to claim 23, wherein said first opening is formed in said first cover member.

26. The vehicle according to claim 23, wherein said leg shield includes an upper surface member disposed on at least one of said first cover member and said second cover member and arranged to extend in a longitudinal direction, and a stowage space is provided on said upper surface member.

27. A vehicle comprising:
a leg shield arranged to cover front portions of legs of a driver riding the vehicle and including a wall member; and
a heat exchanger arranged on a front surface side of said leg shield; wherein
said leg shield includes:
a wind guide space defined by said wall member of said leg shield;
a first opening formed in a portion of said wall member of said leg shield located at least behind said heat exchanger and said first opening being arranged to guide air passing through said heat exchanger to said wind guide space;
a second opening formed in another portion of said wall member of said leg shield that is separated from said first opening by a distance and said second opening being arranged to discharge air that passes through said heat exchanger and is guided to said first opening from said wind guide space;
a third opening connected to said wind guide space and opening toward a front portion of the vehicle; wherein
said first opening is provided on an intermediate portion of a wind guide path for discharging air that is introduced from said third opening to pass through said wind guide space from said second opening;
air in the heat exchanger is exhausted via the first opening by way of streams of air flowing from said third opening toward said second opening; and
said heat exchanger is arranged to extend in a lateral direction of the vehicle,
said leg shield includes a first cover member arranged to extend from a rear portion of said heat exchanger toward a front portion of said heat exchanger through a side portion to at least partially constitute said wind guide space, and said first opening is formed in said first cover member and the heat exchanger extending in the lateral direction of said vehicle is partially arranged in said wind guide space through said first opening.

28. A vehicle comprising:

a leg shield arranged to cover front portions of legs of a driver riding the vehicle and including a wall member; and a heat exchanger arranged on a front surface side of said leg shield; wherein said leg shield includes:

a wind guide space defined by said wall member of said leg shield;

a first opening formed in a portion of said wall member of said leg shield located at least behind said heat exchanger and said first opening being arranged to guide air passing through said heat exchanger to said wind guide space;

a second opening formed in another portion of said wall member of said leg shield that is separated from said first opening by a distance and said second opening being arranged to discharge air that passes through said heat exchanger and is guided to said first opening from said wind guide space;

a third opening connected to said wind guide space and opening toward a front portion of the vehicle; wherein said first opening is provided on an intermediate portion of a wind guide path for discharging air that is introduced from said third opening to pass through said wind guide space from said second opening;

air in the heat exchanger is exhausted via the first opening by way of streams of air flowing from said third opening toward said second opening; and said heat exchanger includes:

a pair of tank members spaced from each other in a lateral direction of the vehicle; and a core member arranged between said pair of tank members; wherein at least one of said pair of tank members is arranged in said wind guide space through said first opening.

* * * * *

UNITED STATES PATENT AND TRADEMARK OFFICE
CERTIFICATE OF CORRECTION

| | |
|---|---|
| PATENT NO. | : 7,387,180 B2 |
| APPLICATION NO. | : 10/515565 |
| DATED | : June 17, 2008 |
| INVENTOR(S) | : Toshihiko Konno et al. |

It is certified that error appears in the above-identified patent and that said Letters Patent is hereby corrected as shown below:

On the first page of the Letter Patent, in the Inventors section, "Gunaguchi" should be corrected to --Sunaguchi--

(75) Inventors: Toshihiko Konno, Shizuoka (JP);
Kaoru Kamimura, Shizuoka (JP);
Naoto Sunaguchi (JP);

Signed and Sealed this

Sixteenth Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,387,180 B2  Page 1 of 1
APPLICATION NO. : 10/515565
DATED : June 17, 2008
INVENTOR(S) : Toshihiko Konno et al.

It is certified that error appears in the above-identified patent and that said Letters Patent is hereby corrected as shown below:

On the first page of the Letters Patent, in the Inventors section, the inventor Naoto Sunaguchi's residence information is missing Title Page should read

(75) Inventors: Toshihiko Konno, Shizuoka (JP)
Kaoru Kamimura, Shizuoka (JP)
Naoto Sunaguchi, Shizuoka (JP)

Signed and Sealed this

Fourth Day of November, 2008

JON W. DUDAS
*Director of the United States Patent and Trademark Office*